US008359004B2

(12) United States Patent  (10) Patent No.: US 8,359,004 B2
Cheng et al.  (45) Date of Patent: Jan. 22, 2013

(54) CHARGING METHOD AND SYSTEM

(75) Inventors: Zhengyue Cheng, Shenzhen (CN); Zhigao Meng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 12/786,100

(22) Filed: May 24, 2010

(65) Prior Publication Data

US 2010/0233994 A1    Sep. 16, 2010

Related U.S. Application Data

(63) Continuation of application No. PCT/CN2008/072848, filed on Oct. 27, 2008.

(30) Foreign Application Priority Data

Dec. 21, 2007    (CN) .......................... 2007 1 0301507

(51) Int. Cl.
    *H04M 11/00*    (2006.01)
(52) U.S. Cl. ....................................... 455/406; 455/433
(58) Field of Classification Search .................. 455/406, 455/433, 405, 422.1, 432.1, 435.1–445; 379/114.01–132
    See application file for complete search history.

(56) References Cited

U.S. PATENT DOCUMENTS

| 2003/0162526 | A1* | 8/2003 | Ogman et al. ................ 455/406 |
| 2005/0055292 | A1* | 3/2005 | Kissner et al. ................. 705/34 |
| 2008/0176535 | A1* | 7/2008 | Cai ........................... 455/414.1 |
| 2009/0060154 | A1* | 3/2009 | Cai ........................... 379/127.05 |

FOREIGN PATENT DOCUMENTS

| CN | 1516516 A | 7/2004 |
| CN | 1852593 A | 10/2006 |
| CN | 101193347 A | 6/2008 |
| CN | 101193347 B | 4/2011 |
| KR | 2001-0065410 A | 7/2001 |
| WO | WO 2007079582 A1 | 7/2007 |

OTHER PUBLICATIONS

Written Opinion of the International Searching Authority issued in corresponding PCT Patent Application No. PCT/CN2008/072848, mailed Feb. 5, 2009.
Communication issued in corresponding European Patent Application No. 08864954.6, mailed Jun. 27, 2011.
International Search Report issued in corresponding PCT Application No. PCT/2008/072848; mailed Feb. 5, 2009.

* cited by examiner

*Primary Examiner* — Chuong A Ngo

(74) *Attorney, Agent, or Firm* — Brinks Hofer Gilson & Lione

(57) ABSTRACT

An intelligent charging triggering method is provided. The method includes receiving a subscriber location data update request sent by a serving mobile switching center (MSC), determining whether subscriber data delivered to the serving MSC carries intelligent subscription data of a prepaid subscriber according to a preset intelligent charging triggering policy, and then delivering the subscriber data carrying the intelligent subscription data to the serving MSC if a determination result is that the subscriber data delivered to the serving MSC carries the intelligent subscription data. A home location register (HLR) and a charging processing system are further provided. The technical solutions can realize real-time charging of a calling service of a prepaid subscriber in a BOSS system when the prepaid subscriber roams in a roaming region of a home country, and meanwhile realize an international roaming service of a prepaid subscriber in an intelligent network (IN).

18 Claims, 12 Drawing Sheets

CHARGING METHOD AND SYSTEM

CROSS-REFERENCE TO RELATED APPLICATIONS

This application is a continuation of International Application No. PCT/CN2008/072848, filed on Oct. 27, 2008, which claims priority to Chinese Patent Application No. 200710301507.0, filed on Dec. 21, 2007, both of which are incorporated herein by reference in their entireties.

FIELD OF THE TECHNOLOGY

The present disclosure relates to the field of mobile communication technology, and more particularly to a charging method and a charging system.

BACKGROUND

Currently, the charging of calling services of mobile subscribers is implemented through the following two modes, namely, an intelligent network-based (IN-based) mode and a billing and operation support system-based (BOSS-based) mode. The IN-based mode charges in real time prepaid subscribers in the IN for call fees, whereas the BOSS-based mode makes full use of the tariff management advantage of the BOSS system to conveniently manage the subscribers and the services. However, the BOSS system can merely realize the quasi-real-time charging of call fees of BOSS subscribers.

During the implementation of the present disclosure, the inventor finds at least the following problems in the prior art.

In the prior art, the BOSS-based mode fails to realize the real-time charging of the calling service of a prepaid subscriber in a roaming region of a home country, and the IN-based mode fails to support an international roaming service of a prepaid subscriber.

SUMMARY

In an embodiment, the present disclosure provides an intelligent charging triggering method, which includes the following steps.

A subscriber location data update request sent by a serving mobile switching center (MSC) is received.

It is determined whether subscriber data delivered to the serving MSC needs to carry intelligent subscription data of a subscriber according to a preset intelligent charging triggering policy, and if yes, the subscriber data carrying the intelligent subscription data is delivered to the serving MSC.

In an embodiment, the present disclosure provides a home location register (HLR), which includes a receiving unit, a determining unit, and a subscriber data delivering unit. The receiving unit is configured to receive a subscriber location data update request sent by a serving MSC. The determining unit is configured to determine whether subscriber data delivered to the serving MSC carries intelligent subscription data of a prepaid subscriber according to a preset intelligent charging triggering policy after the receiving unit receives the request, so as to obtain a determination result. According to the determination result obtained by the determining unit, the subscriber data delivering unit is configured to deliver the subscriber data carrying the intelligent subscription data to the serving MSC, if the determination result is that the subscriber data delivered to the serving MSC carries the intelligent subscription data; or to deliver the subscriber data carrying no intelligent subscription data to the serving MSC, if the determination result is that the subscriber data delivered to the serving MSC does not carry the intelligent subscription data.

In an embodiment, the present disclosure provides an intelligent charging triggering method, which includes the following steps. An HLR receives a BOSS subscriber location data update request sent by a serving MSC in a non-home charging region of a home country. The HLR determines whether BOSS subscriber data delivered to the serving MSC carries BOSS subscriber intelligent subscription data according to a preset intelligent charging triggering policy, and then delivers the BOSS subscriber data to the serving MSC, and then after the serving MSC receives the BOSS subscriber data, the serving MSC triggers a calling service of the BOSS subscriber to a service control point (SCP) disposed between the serving MSC and the BOSS and corresponding to the intelligent subscription data, so that the SCP records calling data of the BOSS subscriber.

In an embodiment, the present disclosure provides a charging processing system, which includes an HLR, a serving MSC in a non-home charging region of a home country, a BOSS, an SCP disposed between the serving MSC and the BOSS, and a BOSS subscriber. The HLR is configured to receive a subscriber location data update request sent by the serving MSC. After receiving the request, the HLR determines whether subscriber data delivered to the serving MSC carries intelligent subscription data of a prepaid subscriber according to a preset intelligent charging triggering policy, so as to obtain a determination result. If the determination result is that the subscriber data delivered to the serving MSC carries the intelligent subscription data, the subscriber data carrying the intelligent subscription data is delivered to the serving MSC. If the determination result is that the subscriber data delivered to the serving MSC does not carry the intelligent subscription data, the subscriber data carrying no intelligent subscription data is delivered to the serving MSC. The serving MSC is configured to receive the BOSS subscriber data and trigger a calling service of the BOSS subscriber to the SCP. The SCP is configured to record current calling data of the prepaid subscriber.

In an embodiment, the present disclosure provides an intelligent charging triggering method, which includes the following steps. An HLR receives a subscriber location data update request of a prepaid subscriber in an IN sent by a serving MSC in a non-home country. The HLR determines that subscriber data of the prepaid subscriber delivered to the serving MSC in the non-home country does not carry intelligent subscription data of the prepaid subscriber according to a preset intelligent charging triggering policy, and delivers the subscriber data of the prepaid subscriber carrying no intelligent subscription data to the serving MSC. Then, the serving MSC receives the subscriber data, and then records calling data of the prepaid subscriber.

In an embodiment, the present disclosure provides a charging processing system, which includes an HLR, a serving MSC in a non-home country, and a prepaid subscriber in an IN. The HLR receives a subscriber location data update request sent by a serving MSC, in which the serving MSC is the serving MSC of a non-home country, and the subscriber is the prepaid subscriber. After receiving the request, the HLR determines whether subscriber data delivered to the serving MSC carries intelligent subscription data of the prepaid subscriber according to a preset intelligent charging triggering policy, so as to obtain a determination result. If the determination result is that the subscriber data delivered to the serving MSC carries the intelligent subscription data, the subscriber data carrying the intelligent subscription data is delivered to the serving MSC. If the determination result is that the subscriber data delivered to the serving MSC does not carry the intelligent subscription data, the subscriber data carrying no intelligent subscription data is delivered to the serving MSC. The serving MSC in the non-home country sends the subscriber location data update request to the HLR, receives the subscriber data of the prepaid subscriber carrying no intelligent subscription data delivered by the HLR, and records calling data of the prepaid subscriber.

Compared with the conventional art, in the technical solutions according to the embodiments of the present disclosure, the intelligent subscription data is additionally carried in the subscriber data delivered to the serving MSC, and thus, the real-time charging can be realized for a prepaid subscriber in a BOSS system that roams in a roaming region of a home country; and meanwhile, an international roaming service can be realized for a prepaid subscriber in an IN.

DETAILED DESCRIPTION OF THE EMBODIMENTS

The various embodiments of the present disclosure are described below in detail with reference to the accompanying drawings.

An HLR serves as a network element for storing subscriber subscription data in a core network side, which plays an important role in carrying out services of the subscriber. For example, when the charging process for a calling service of the subscriber is carried out, a serving MSC sends a subscriber location update request to the HLR, the HLR delivers subscriber information or data to the serving MSC, and then the serving MSC carries out a corresponding charging process for the calling service of the subscriber according to the received subscriber information or data. Generally, as for an intelligent charging situation, after receiving the subscriber location update request sent by the serving MSC, regardless of the specific location of the subscriber, the HLR sends the locally stored intelligent subscription information or data of the subscriber to the serving MSC to realize the intelligent charging.

In an embodiment, the present disclosure provides an intelligent charging triggering method, which makes an improvement on the capabilities of the HLR, that is, if the intelligent subscription data of the subscriber is stored locally, the HLR does not directly deliver the intelligent subscription data of the subscriber to the serving MSC when the subscriber location data is updated, but determine whether to deliver the intelligent subscription data of the subscriber according to a preset intelligent charging triggering policy.

Figure 1:
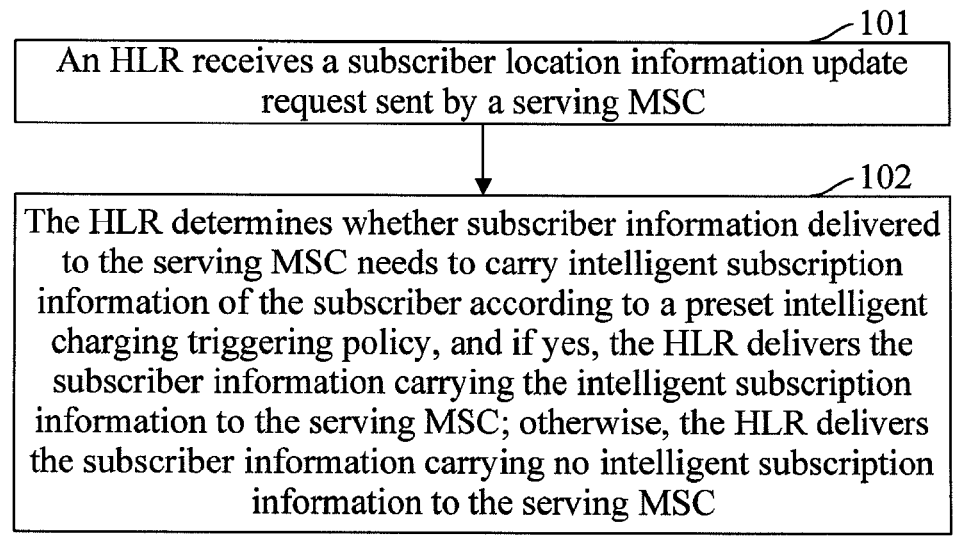
FIG. 1 is a flow chart of an intelligent charging triggering method according to an embodiment of the present disclosure.

FIG. 1 is a flow chart of an intelligent charging triggering method according to an embodiment of the present disclosure. Referring to FIG. 1, the process includes the following steps.

In step 101, an HLR receives a subscriber location data update request sent by a serving MSC.

In step 102, the HLR determines whether subscriber data delivered to the serving MSC needs to carry intelligent subscription data of the subscriber or not according to a preset intelligent charging triggering policy. if the subscriber data delivered to the serving MSC needs to carry intelligent subscription data of the subscriber, the HLR delivers the subscriber data carrying the intelligent subscription data to the serving MSC; otherwise, the HLR delivers the subscriber data carrying no intelligent subscription data to the serving MSC.

In the embodiment of the present disclosure, the intelligent charging triggering policy may be as follows.

When the subscriber is a BOSS subscriber, if the BOSS subscriber is located at a non-home charging region of a home country, the intelligent subscription data needs to be delivered to the serving MSC, and the HLR delivers the intelligent subscription data to the serving MSC through the SCP. Alternatively, if the BOSS subscriber is located at a home charging region of a home country, the intelligent subscription data does not need to be delivered to the serving MSC.

When the subscriber is a prepaid subscriber in an IN, if the prepaid subscriber in an IN roams in a home country, the intelligent subscription data needs to be delivered to the serving MSC. Alternatively, if the prepaid subscriber in the IN roams to a non-home country, the intelligent subscription data does not need to be delivered to the serving MSC.

Figure 2:
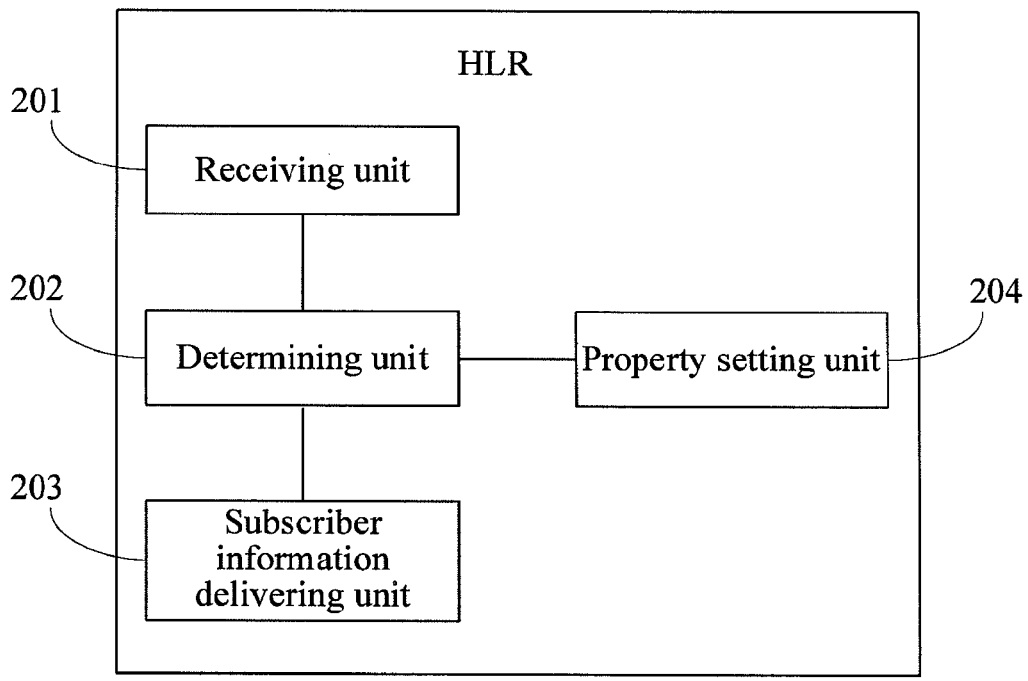
FIG. 2 is a schematic structural view of an HLR according to an embodiment of the present disclosure.

Correspondingly, FIG. 2 is a schematic structural view of an HLR according to an embodiment of the present disclosure. Referring to FIG. 2, the HLR includes a receiving unit 201, a determining unit 202, and a subscriber data delivering unit 203.

The receiving unit 201 is configured to receive a subscriber location data update request sent by a serving MSC.

The determining unit 202 is configured to determine whether subscriber data delivered to the serving MSC needs to carry intelligent subscription data of a prepaid subscriber according to a preset intelligent charging triggering policy after the receiving unit 201 receives the request, so as to obtain a determination result.

According to the determination result obtained by the determining unit 202, the subscriber data delivering unit 203 is configured to deliver the subscriber data carrying the intelligent subscription data to the serving MSC if the determination result is that the subscriber data delivered to the serving MSC needs to carry the intelligent subscription data, or to deliver the subscriber data carrying no intelligent subscription data to the serving MSC if the determination result is that the subscriber data delivered to the serving MSC does not need to carry the intelligent subscription data.

In the embodiment of the present disclosure, the HLR shown in FIG. 2 further includes a property setting unit 204.

According to the determination result obtained by the determining unit 202, the property setting unit 204 is configured to set a locally stored subscriber property to an intelligent subscription subscriber if the determination result is that the subscriber data delivered to the serving MSC needs to carry the intelligent subscription data, or to set the locally stored subscriber property to a non-intelligent subscription subscriber if the determination result is that the subscriber data delivered to the serving MSC does not need to carry the intelligent subscription data.

By using the HLR and the intelligent charging triggering method provided in the above embodiments of the present disclosure, a BOSS-based charging solution of a BOSS subscriber, and an IN-based charging solution of a prepaid subscriber can be improved.

Figure 3:
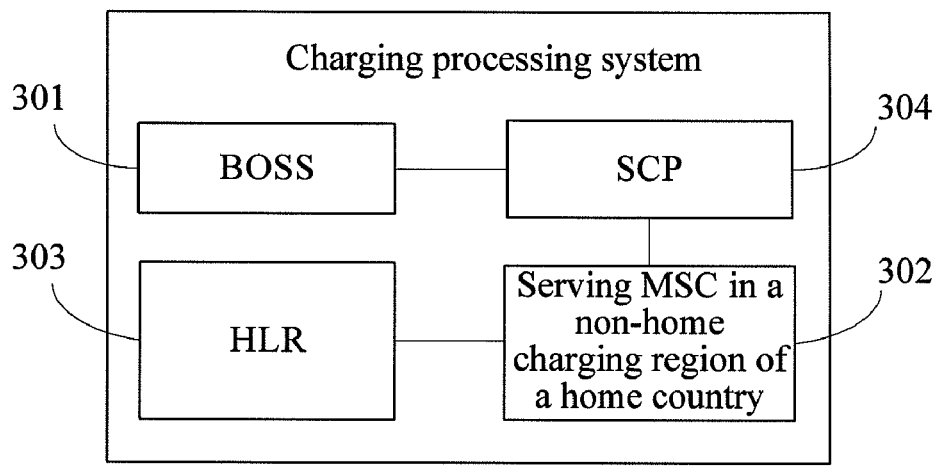
FIG. 3 is a schematic structural view of a charging processing system according to an embodiment of the present disclosure.
Figure 4:
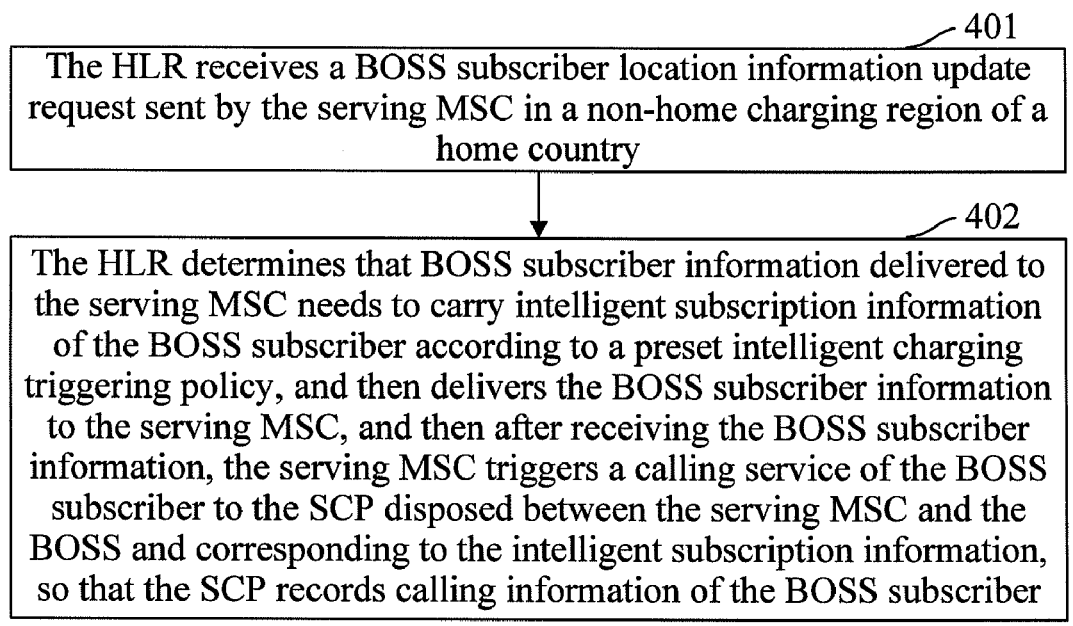
FIG. 4 is a flow chart of another intelligent charging triggering method according to an embodiment of the present disclosure.

In the case of a BOSS-based charging solution of a BOSS subscriber, in order to enable the BOSS system to carry out a real-time monitoring on a calling service of the BOSS subscriber roaming to a non-home charging region of a home country, an SCP is disposed between a billing system of the BOSS system and a switching device at a core network side, for example, a serving MSC in a non-home charging region of a home country, or a serving MSC in a non-home charging region of a home country containing a visitor location register (VLR). FIG. 3 is a schematic structural view of a charging processing system according to an embodiment of the present disclosure. Referring to FIG. 3, the charging processing system includes a BOSS 301, a serving MSC 302 in a non-home charging region of a home country, an HLR 303, and an SCP 304 disposed between the BOSS system and the serving MSC. The HLR may be the HLR shown in FIG. 2. Corresponding to the charging processing system shown in FIG. 3, an embodiment of the present disclosure further provides an intelligent charging triggering method. FIG. 4 is a flow chart of the intelligent charging triggering method. Referring to FIG. 4, the process includes the following steps.

In step 401, the HLR 303 receives a BOSS subscriber location data update request sent by the serving MSC 302 in a non-home charging region of a home country.

In step 402, the HLR 303 determines that BOSS subscriber data delivered to the serving MSC 302 needs to carry intelligent subscription data of the BOSS subscriber according to a preset intelligent charging triggering policy, and delivers the BOSS subscriber data to the serving MSC 302. In response to receiving the BOSS subscriber data, the serving MSC 302 triggers a calling service of the BOSS subscriber to the SCP 304 which disposes between the serving MSC 302 and the BOSS 301 and corresponds to the intelligent subscription data, so that the SCP 304 records calling data of the BOSS subscriber.

The flow chart of the method shown in FIG. 4 enables the real-time charging to be carried out for the calling service of the BOSS subscriber in the BOSS when the BOSS subscriber roams to a non-home charging region of a home country, which thus guarantees the benefits of the operator.

The above technical solutions according to the embodiments of the present disclosure are further demonstrated below with reference to specific embodiments.

Embodiment 1

Figure 5:
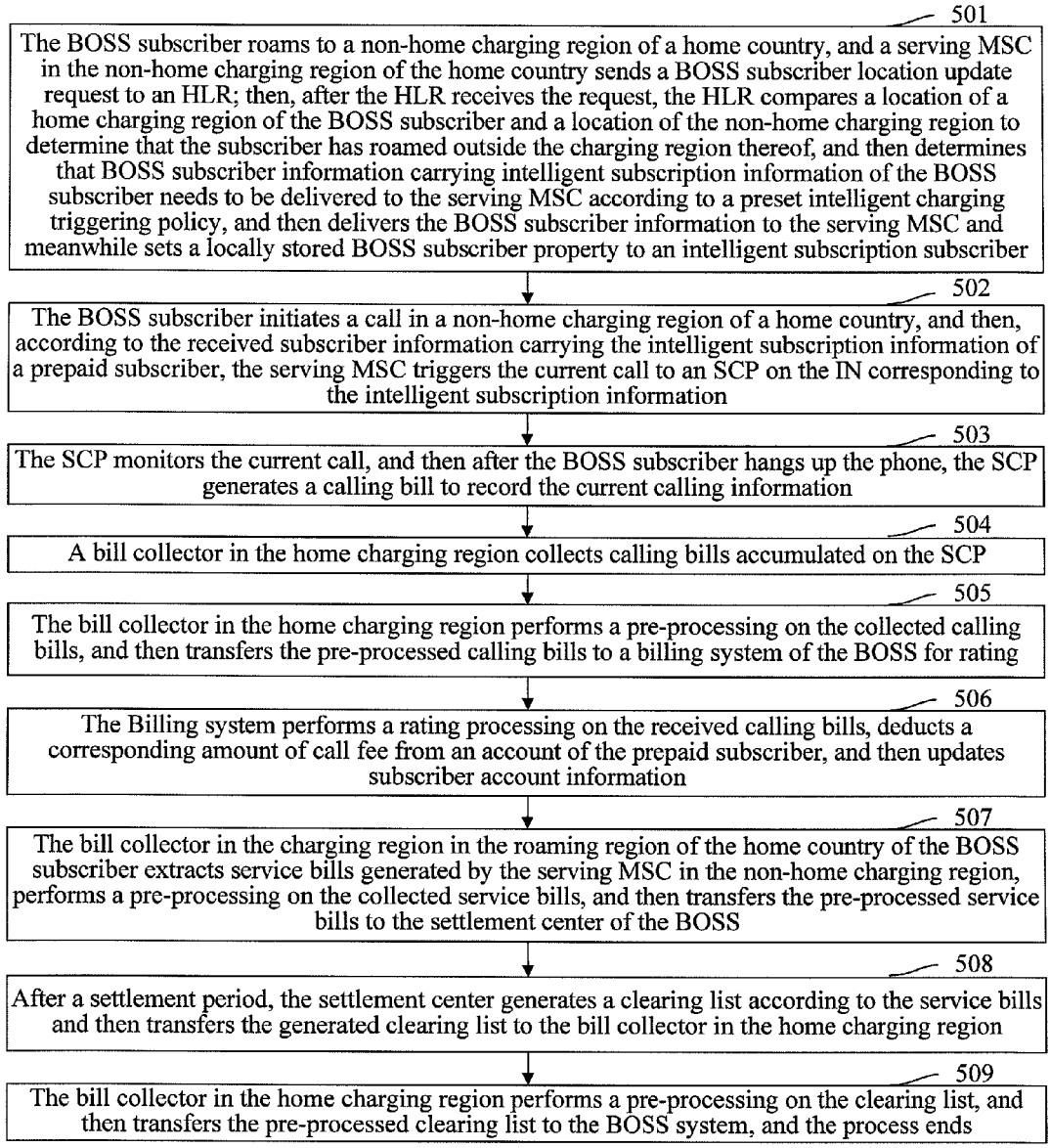
FIG. 5 is a flow chart of fee monitoring of a BOSS subscriber in a roaming region of a home country according to a first embodiment of the present disclosure.

FIG. 5 is a flow chart of fee monitoring of a BOSS subscriber in a roaming region of a home country according to a first embodiment of the present disclosure. Referring to FIG. 5, the process includes the following steps.

In step 501, the BOSS subscriber roams to a non-home charging region of a home country, and a serving MSC in the non-home charging region of the home country sends a BOSS subscriber location update request to an HLR; after the HLR receives the request, the HLR compares a location of a home charging region of the BOSS subscriber and a location of the non-home charging region to determine that the subscriber has roamed outside the charging region thereof, and determines that BOSS subscriber data carrying intelligent subscription data of the BOSS subscriber needs to be delivered to the serving MSC according to a preset intelligent charging triggering policy, and delivers the BOSS subscriber data to the serving MSC and sets a locally stored BOSS subscriber property to an intelligent subscription subscriber.

In step 501, the HLR may compare a received MSC identity (MSCID) of the serving MSC/VLR that sends the subscriber location update request with an MSCID of an MSC in a home charging region, and when the two MSCIDs are determined to be different, the HLR determines that the BOSS subscriber roams outside the home charging region.

In the first embodiment of the present disclosure, the employed intelligent charging triggering policy is as follows. When the BOSS subscriber is located at a non-home charging region of a home country, the intelligent subscription data needs to be delivered to the serving MSC. That is, in the case that the BOSS subscriber roams to a non-home charging region of a home country, the BOSS-based charging solution in the conventional art still cannot realize a real-time charging. Thus, in this case, the calling service of the BOSS subscriber in the non-home charging region of the home country is triggered to a corresponding SCP, so that the SCP monitors the calling service of the BOSS subscriber in real time, thereby realizing the real-time charging. Therefore, during the specific implementation, the intelligent subscription data of the BOSS subscriber needs to be delivered to the serving MSC in the non-home charging region.

On the contrary, if the BOSS subscriber is located at a home charging region of the home country, the BOSS-based charging solution in the prior art is sufficiently mature for realizing the charging of the BOSS subscriber in the home charging region. Thus, the calling service of the BOSS subscriber does not need to be triggered to the SCP, that is, the intelligent subscription data of the BOSS subscriber does not need to be delivered to the serving MSC in the home charging region.

Thus, the BOSS-based charging solution in the conventional art can still be used for carrying out the quasi-real-time monitoring on the calling service of the BOSS subscriber in the home charging region of the home country.

In an embodiment of the present disclosure, the operation of setting the locally stored subscriber property to the intelligent subscription subscriber performed by the HLR may include modifying the originally stored user property, for example, modifying the originally stored user property of a non-intelligent subscription subscriber to an intelligent subscription subscriber.

In step 502, the BOSS subscriber initiates a call in a non-home charging region of a home country. According to the received subscriber data carrying the intelligent subscription data of a prepaid subscriber, the serving MSC triggers the current call to an SCP on the IN corresponding to the intelligent subscription data.

In step 503, the SCP monitors the current call, and after the BOSS subscriber hangs up the phone, the SCP generates a calling bill to record the current calling data.

The above calling data may include at least one of a call duration, a calling position, and a service type. The functions of the SCP, including monitoring the call and generating the calling bill, required in the embodiment of the present disclosure are functions already realized by the conventional SCP.

In step 504, a bill collector in the home charging region collects calling bills accumulated on the SCP.

In step 504, the bill collector in the home charging region may collect the calling bills on the SCP periodically, and the period is generally set to five minutes.

In step 505, the bill collector in the home charging region performs a pre-processing on the collected calling bills, and transfers the pre-processed calling bills to a billing system of the BOSS for rating.

In step 506, the billing system performs the rating on the received calling bills, deducts a corresponding amount of call fee from an account of the prepaid subscriber, and then updates subscriber account data.

The performing of steps 501-506 enables the BOSS system to utilize the SCP to perform a real-time monitoring on the services of the prepaid subscriber in a roaming region of the home country, thereby realizing a real-time charging on the BOSS subscriber in the BOSS system.

After step 506, it may further set that, if the billing system determines that the account balance of the BOSS subscriber is lower than a preset minimum account threshold, the billing system, for example, sends a short message to remind the BOSS subscriber to recharge.

When the BOSS subscriber initiates a calling service in a non-home charging region of the home country, it generally uses network resources provided by two operators. Thus, the two operators share the fees paid by the BOSS subscriber for the calling service initiated in the non-home charging region according to a certain proportion. Accordingly, from step 507 on, the operation of performing a settlement by a settlement center about the respective available fees charged by the two operators is realized as follows.

In step 507, the bill collector in the charging region in the roaming region of the home country of the BOSS subscriber extracts service bills generated by the serving MSC in the non-home charging region, performs a pre-processing on the collected service bills, and then transfers the pre-processed service bills to the settlement center of the BOSS.

In step 507, the function of the serving MSC in the non-home charging region of generating service bills is one of the existing functions thereof.

In step 508, after a settlement period, the settlement center generates a clearing list according to the service bills and transfers the generated clearing list to the bill collector in the home charging region.

In step 509, the bill collector in the home charging region performs a pre-processing on the clearing list, and then transfers the pre-processed clearing list to the BOSS system. The process ends.

Embodiment 2

Figure 6:
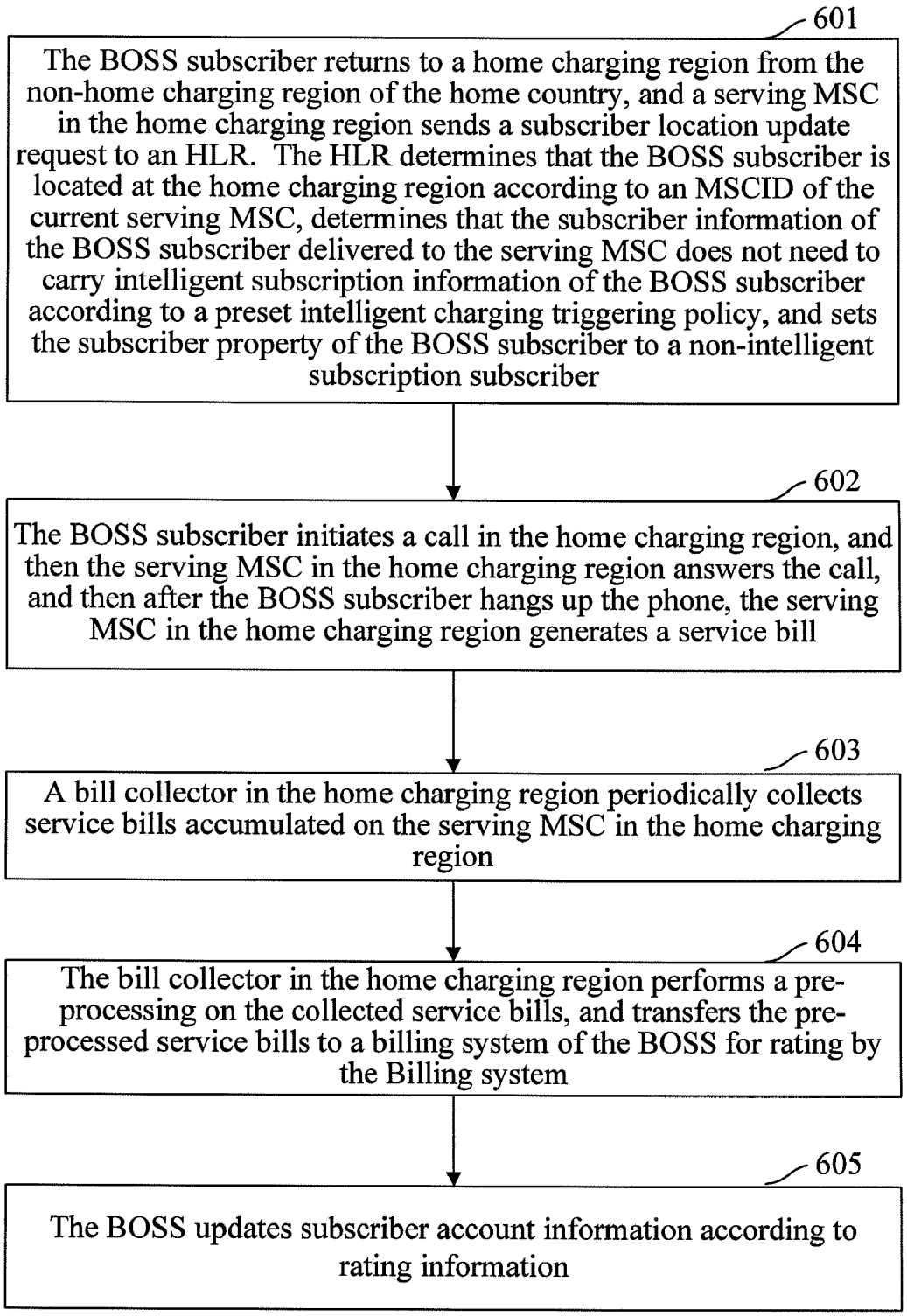
FIG. 6 is a flow chart of real-time monitoring of a calling service of a BOSS subscriber when the BOSS subscriber returns to a home charging region according to a second embodiment of the present disclosure.

In the second embodiment, it is assumed that the BOSS subscriber returns to a home charging region from the non-home charging region of the home country. FIG. 6 is a flow chart of real-time monitoring of a calling service of a BOSS subscriber when the BOSS subscriber returns to a home charging region according to a second embodiment of the present disclosure. Referring to FIG. 6, the process includes the following steps.

In step 601, the BOSS subscriber returns to a home charging region from the non-home charging region of the home country, and a serving MSC in the home charging region sends a subscriber location update request to an HLR. The HLR determines that the BOSS subscriber is located at the home charging region according to an MSCID of the current serving MSC, determines that the subscriber data of the BOSS subscriber delivered to the serving MSC does not need to carry intelligent subscription data of the BOSS subscriber according to a preset intelligent charging triggering policy, and sets the subscriber property of the BOSS subscriber to a non-intelligent subscription subscriber.

In the second embodiment, the employed intelligent charging triggering policy is as follows. If the BOSS subscriber is located at the home charging region of the home country, the intelligent subscription data does not need to be delivered to the serving MSC. The charging of the BOSS subscriber is realized by the serving MSC in the home charging region.

The operation of setting the subscriber property by the HLR may include modifying by the HLR the originally stored subscriber property into a non-intelligent subscription subscriber if the original locally stored subscriber property is an intelligent subscription subscriber.

In step 602, the BOSS subscriber initiates a call in the home charging region, and the serving MSC in the home charging region answers the call, and after the BOSS subscriber hangs up the phone, the serving MSC in the home charging region generates a service bill.

In step 603, a bill collector in the home charging region periodically collects service bills accumulated on the serving MSC in the home charging region.

In step 604, the bill collector in the home charging region performs a pre-processing on the collected service bills, and transfers the pre-processed service bills to a billing system of the BOSS for rating by the billing system.

In step 605, the BOSS updates subscriber account data according to rating data.

The above steps 602-605 may be realized by a charging process of the BOSS-based charging solution for the BOSS subscriber in the conventional art.

Taking a Code Division Multiple Access (CDMA) mobile communication system and a Global System for Mobile Communications (GSM) for example, the real-time charging solutions for a prepaid subscriber in the two mobile communication systems realized by using the technical solutions provided by the embodiments of the present disclosure are described as follows.

Embodiment 3

Figure 7:
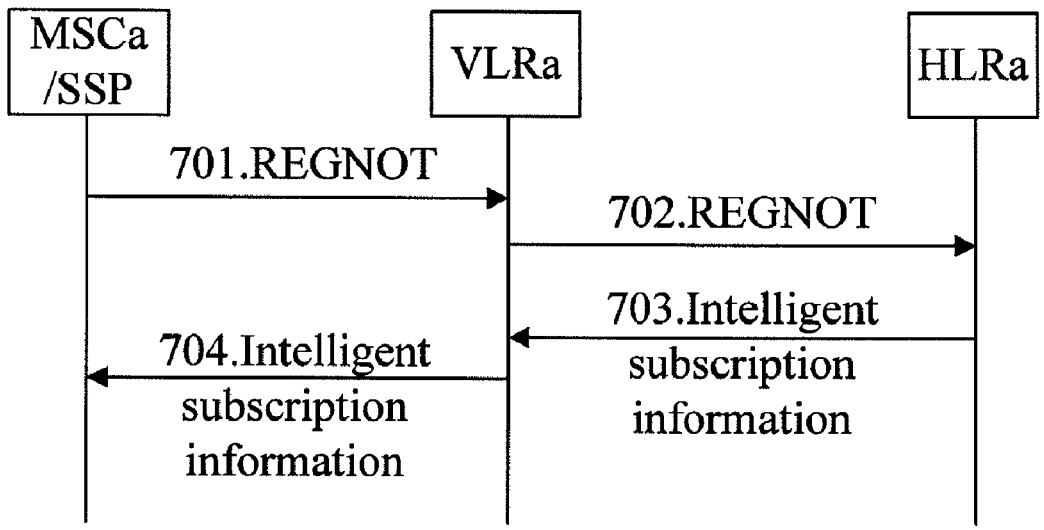
FIG. 7 is a flow chart of intelligent charging triggering when a BOSS subscriber leaves a home location according to a third embodiment of the present disclosure.

In the third and fourth embodiments, it is assumed that the communication system accessed by the prepaid subscriber is the CDMA system. FIG. 7 is a flow chart of intelligent charging triggering when a BOSS subscriber leaves a home location according to a third embodiment of the present disclosure. Referring to FIG. 7, the process includes the following steps.

In step 701, a BOSS subscriber performs a power-on process in a non-home charging region of a home country, and initiates a registration process. A serving MSCa in the non-home charging region of the home country determines that the BOSS subscriber enters a serving area thereof, the serving MSCa sends a Registration Notification INVOKE (REGNOT) message to a local VLR, so as to request a service item list and authorization data of the BOSS subscriber from the VLR. The REGNOT message carries parameters listed in Table 1, including an MSCID of the serving MSCa, in which the carried Transaction Capability (TRANSCAP) parameter indicates that the serving MSCa can process a Trigger Address List (TRIGADDRLIST) parameter, and the WIN Capability (WINCAP) parameter indicates that the serving MSC has a WIN capability.

The serving MSCa may be configured with a service switching point (SSP).

TABLE 1

| Parameters | Usage | Reference | Type |
|---|---|---|---|
| MSCID | Serving MSC MSCID. | 4.2.1 | R |
| MSID | Served MS MSID.* | 4.2.2 | R |
| ESN | Served MS ESN. | 4.2.3 | R |
| TRANSCAP | System's transaction capability. | 4.2.4 | R |
| WINCAP | System's WIN capability. | 4.2.5 | R |
| QUALCODE | Type of qualification data required. **(Qualification Information Code) | 4.2.6 | R |

In Table 1, the MSCID indicates an ID of a serving MSC, the MSID indicates an ID of a served MS, and the QUALCODE indicates a type of qualification data required.

In step 702, a serving VLR determines that subscriber data of the BOSS subscriber is not stored locally, and forwards the received REGNOT message to an HLR that records all the data of the BOSS subscriber.

In steps 703-704, the HLR determines to authorize the BOSS subscriber, and determines that the BOSS subscriber roams in the non-home charging region of the home country according to the MSCID of the serving MSCa in the current location of the BOSS subscriber, and then the HLR sets the locally stored subscriber property of the BOSS subscriber to the intelligent subscription subscriber, and delivers the subscriber data carrying intelligent subscription data of the BOSS subscriber to the serving MSCa according to a preset intelligent charging triggering policy.

During the specific implementation, the operation of delivering the subscriber data carrying the intelligent subscription data of the BOSS subscriber to the serving MSCa by the HLR may include: configuring an intelligent subscription data list (Trigaddr List) of the BOSS subscriber, carrying the Trigaddr List in a response message of a REGNOT message for being sent to the serving VLR, and returning the response message of a REGNOT message to the serving MSCa by the serving VLR.

The parameters in the Trigaddr List may indicate activating the intelligent subscription data including Origination_Attempt_Authorized, O_Answer, O_Disconnect, Calling_Routing_Address_Available, T_Answer, T_Disconnect, and the like.

If the SSP in the IN supports O_Called_Party_Busy DP and O_No_Answer DP, two triggers may be additionally configured in the Trigaddr List: O_Busy and O_No_Answer.

After step 704, the serving MSCa triggers the calling service of the BOSS subscriber to the corresponding SCP according to received intelligent subscription data, so that the SCP/SSP performs a real-time monitoring on the calling service of the BOSS subscriber, which is not described again here.

Embodiment 4

Figure 8:
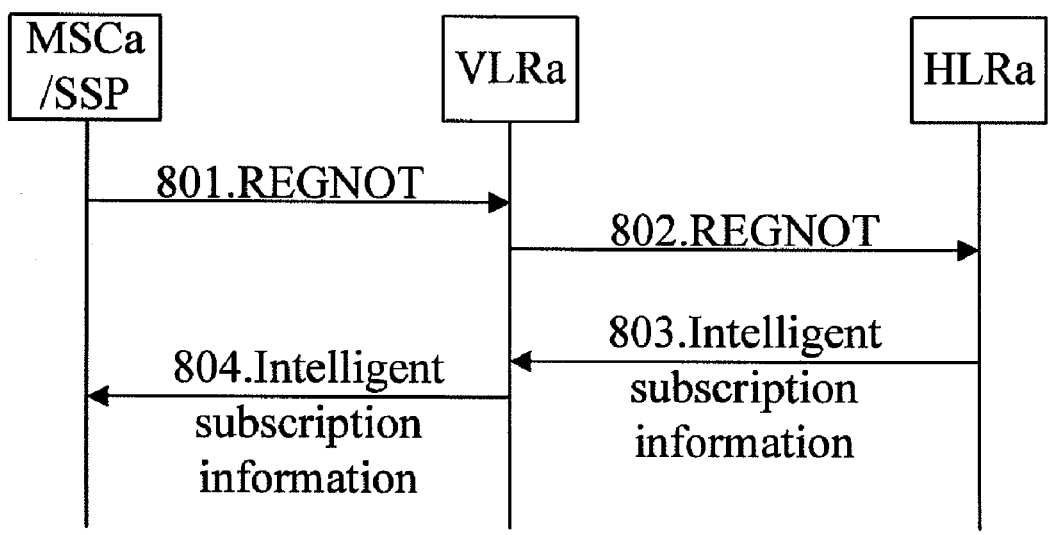
FIG. 8 is a flow chart of a charging process when a BOSS subscriber returns to a home charging region according to a fourth embodiment of the present disclosure.

In the fourth embodiment, it is assumed that the BOSS subscriber returns to a home charging region from the non-home charging region of the home country. FIG. 8 is a flow chart of a charging process when a BOSS subscriber returns to a home charging region according to a fourth embodiment of the present disclosure. Referring to FIG. 8, the process includes the following steps.

In step 801, the BOSS subscriber performs a power-on process in the home charging region, and initiates a registration process. A serving MSCb in the home charging region initiates a REGNOT message to an HLR, and requests to update the subscriber location. The REGNOT message carries an MSCID of the serving MSCb, and the serving MSCb supports data such as a Trigaddr List.

In step 802, a serving VLR determines that subscriber information or data of the BOSS subscriber is not locally stored in the VLR, and forwards the received REGNOT message to the HLR that records all the information or data of the BOSS subscriber.

In steps 803-804, the HLR determines to authorize the BOSS subscriber, and determines that the BOSS subscriber is located at the home charging region according to the MSCID of the serving MSCb in the current location of the BOSS subscriber. The HLR modifies the locally stored subscriber property of the BOSS subscriber to a non-intelligent subscription subscriber, and returns a response message of the REGNOT message to the serving MSCb via the serving VLR according to a preset intelligent charging triggering policy. The response message carries the subscriber data of the BOSS subscriber delivered to the serving MSCb, and the subscriber data of the BOSS subscriber does not carry intelligent subscription data of the BOSS subscriber.

After step 804, the serving MSCb performs a quasi-real-time monitoring on the calling service of the BOSS subscriber in the home charging region, and the subsequent process is similar to the conventional art, which is not described again here.

Embodiment 5

Figure 9:
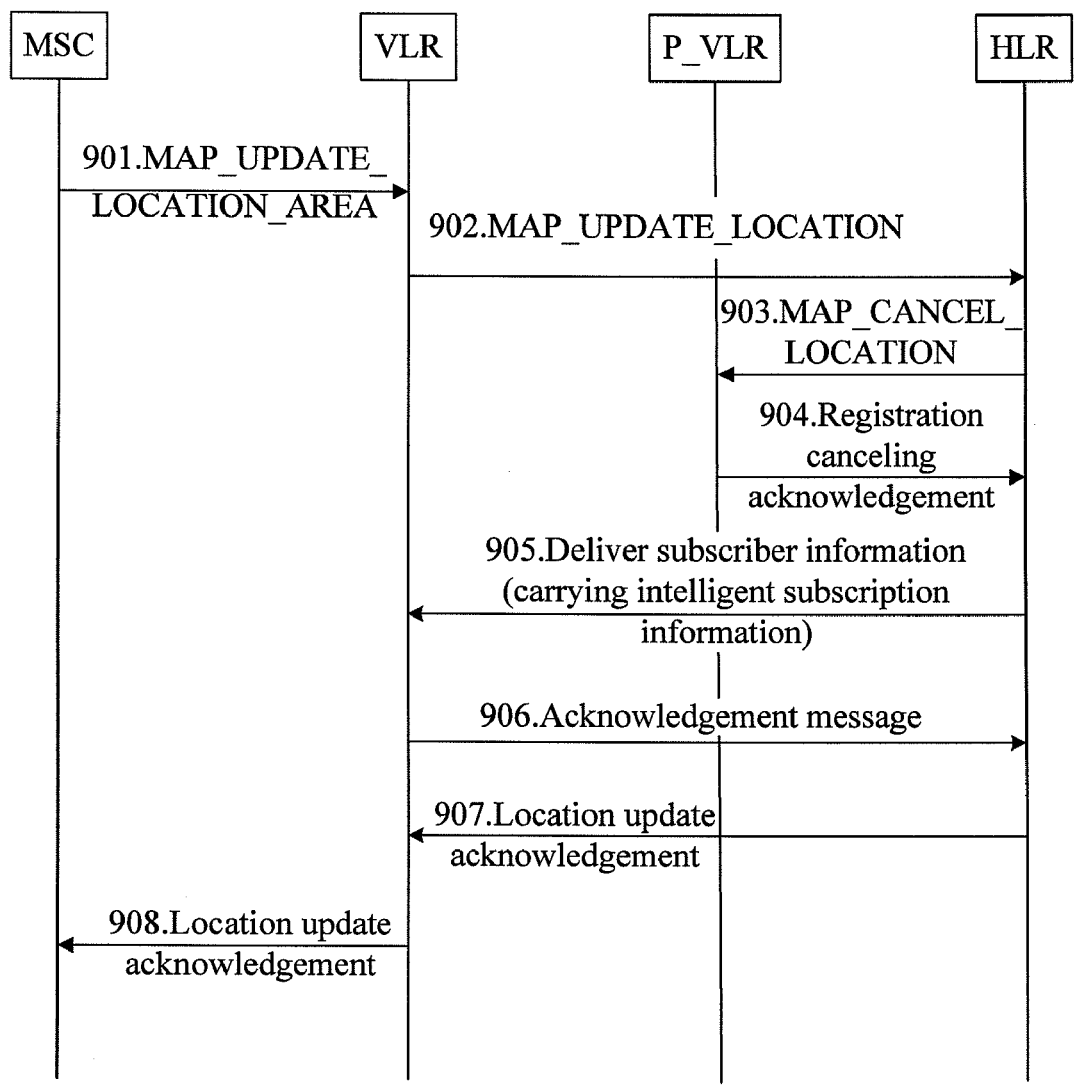
FIG. 9 is a flow chart of intelligent charging triggering when a BOSS subscriber leaves a home charging region according to a fifth embodiment of the present disclosure.

In the fifth and sixth embodiments, it is assumed that a communication system accessed by the BOSS subscriber is a GSM system. FIG. 9 is a flow chart of intelligent charging triggering when a BOSS subscriber leaves a home charging region according to a fifth embodiment of the present disclosure. Referring to FIG. 9, the process includes the following steps.

In step 901, the BOSS subscriber roams out of the home charging region to enter a non-home charging region of a home country, and a serving MSC in the non-home charging region of the home country detects that the BOSS subscriber accesses a serving area of the serving MSC, and sends a location update (MAP_UPDATE_LOCATION_AREA) message to a local serving VLR.

In step 902, the local serving VLR detects that data of the BOSS subscriber is not registered locally, and forwards the MAP_UPDATE_LOCATION message to an HLR in a home location of the BOSS subscriber.

In steps 903-904, the HLR stores the address data of a previous VLR (P_VLR) of the BOSS subscriber, and sends a registration cancel (MAP_CANCEL_LOCATION) message to the P_VLR, and the P_VLR receives the MAP_CANCEL_LOCATION message and deletes the registration data of the BOSS subscriber from a local database.

In step 905, the HLR receives a registration canceling response message returned by the P_VLR, and sends subscriber data to the local serving VLR. The HLR configures intelligent subscription data (O_CSI) of the prepaid subscriber in the subscriber data returned to the VLR according to a preset intelligent charging triggering policy based on the data that the current location of the prepaid subscriber is the non-home charging region of the home country, and sets the locally stored property of the prepaid subscriber to an intelligent subscription subscriber.

In steps 906-908, after the subscriber data of the BOSS subscriber is successfully registered in the local serving VLR, the local serving VLR returns a response message to the HLR; and the HLR returns the response message that the location of the BOSS subscriber is successfully updated to the serving MSC in the non-home charging region through the local serving VLR.

After step 908, the serving MSC in the non-home charging region triggers the subsequent calling of the BOSS subscriber to a corresponding SCP by using the subscriber data of the BOSS subscriber carrying the intelligent subscription data, so that the SCP monitors the calling service of the BOSS subscriber.

Embodiment 6

Figure 10:
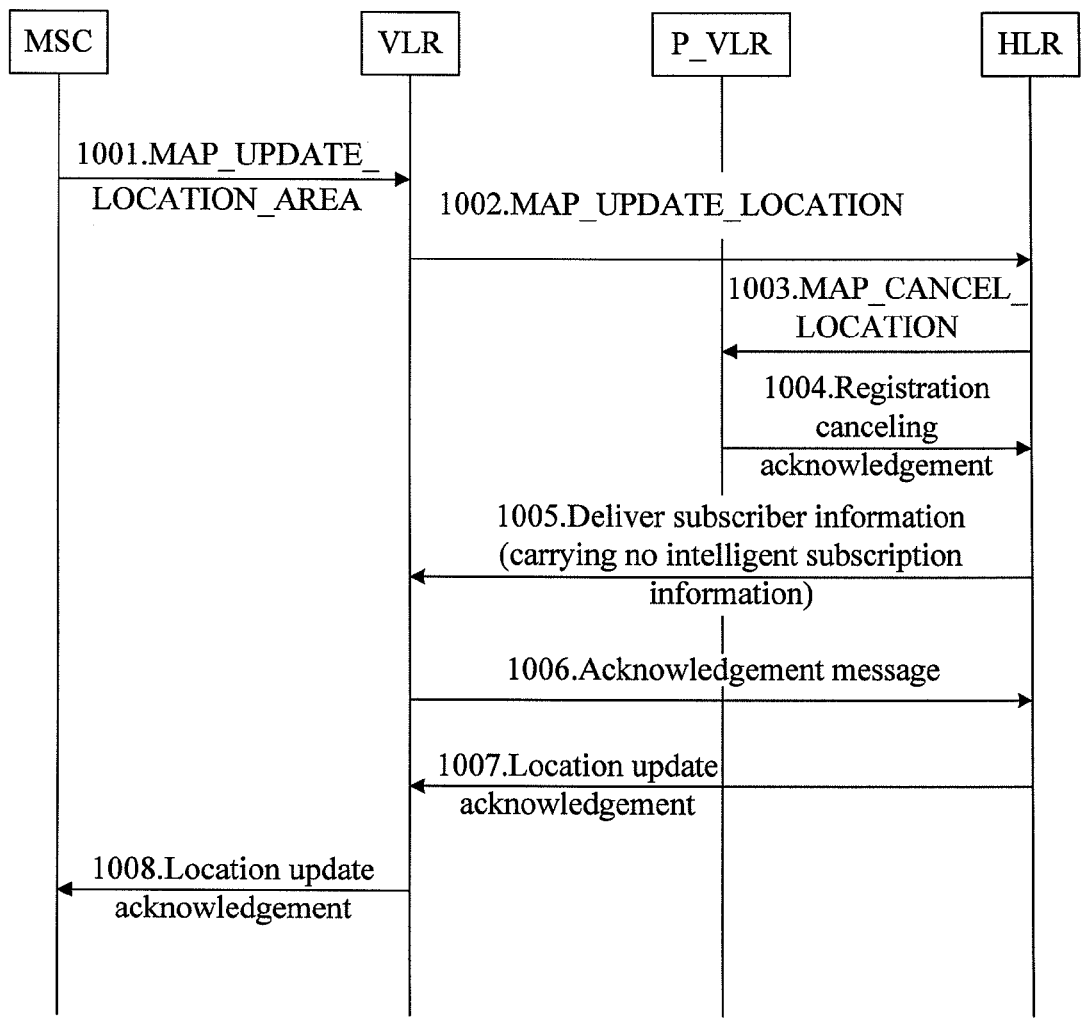
FIG. 10 is a flow chart of a charging process when a BOSS subscriber returns to a home charging region according to a sixth embodiment of the present disclosure.

FIG. 10 is a flow chart of a charging process when a BOSS subscriber returns to a home charging region according to a sixth embodiment of the present disclosure. Referring to FIG. 10, the process includes the following steps.

In step 1001, the BOSS subscriber returns to the home charging region, and a serving MSC in the home charging region detects that the BOSS subscriber accesses a serving area of the serving MSC, and sends a MAP_UPDATE_LOCATION_AREA message to a current serving VLR.

In step 1002, the current serving VLR detects that data of the BOSS subscriber is not registered in the VLR, and forwards the MAP_UPDATE_LOCATION message to an HLR in a home location of the BOSS subscriber.

In steps 1003-1004, the HLR stores the address data of a P_VLR of the BOSS subscriber, and sends a MAP_CANCEL_LOCATION message to the P_VLR, and the P_VLR receives the MAP_CANCEL_LOCATION message and deletes the registration data of the BOSS subscriber from a local database.

In step 1005, the HLR receives a registration canceling acknowledgement data returned by the P_VLR, and sends subscriber data to the current serving VLR. The HLR does not carry intelligent subscription data of the BOSS subscriber in the subscriber data delivered to the current serving VLR according to a preset intelligent charging triggering policy based on the determination that the current location of the BOSS subscriber is the home charging region.

In steps 1006-1008, after the subscriber data of the BOSS subscriber returned by the HLR is successfully registered in the current serving VLR, the current serving VLR returns a response message to the HLR. The HLR returns the response message that the location of the BOSS subscriber is successfully updated to the serving MSC in the home charging region through the current serving VLR, and the response message carries the subscriber data of the BOSS subscriber, and the subscriber data of the BOSS subscriber does not carry the intelligent subscription data of the BOSS subscriber.

After step 1008, the serving MSC in the charging region monitors the calling service of the BOSS subscriber, which is not described again here.

As known from the above description, in the embodiments of the present disclosure, by using the HLR and charging solutions provided in the embodiments of the present disclosure, the quasi-real-time charging is realized for the call fees generated by the calling service of the BOSS subscriber in the non-home charging region of the home country. On one hand, the user experience of the BOSS subscriber when performing the service is not altered; on the other hand, the loss of the operators caused by a large amount of overdraft of the BOSS subscriber in the non-home charging region can be effectively prevented. Furthermore, since the charging of the BOSS subscriber in the roaming region of the home country is the quasi-real-time charging, if the BOSS subscriber intends to perform an unsubscribed service, the unsubscribed service can be performed timely. Thus, the subscriber does not need to pay the caution money, and the logout service can be completed without waiting for a settlement period, so as to improve the satisfaction degree of the subscriber.

Figure 11:
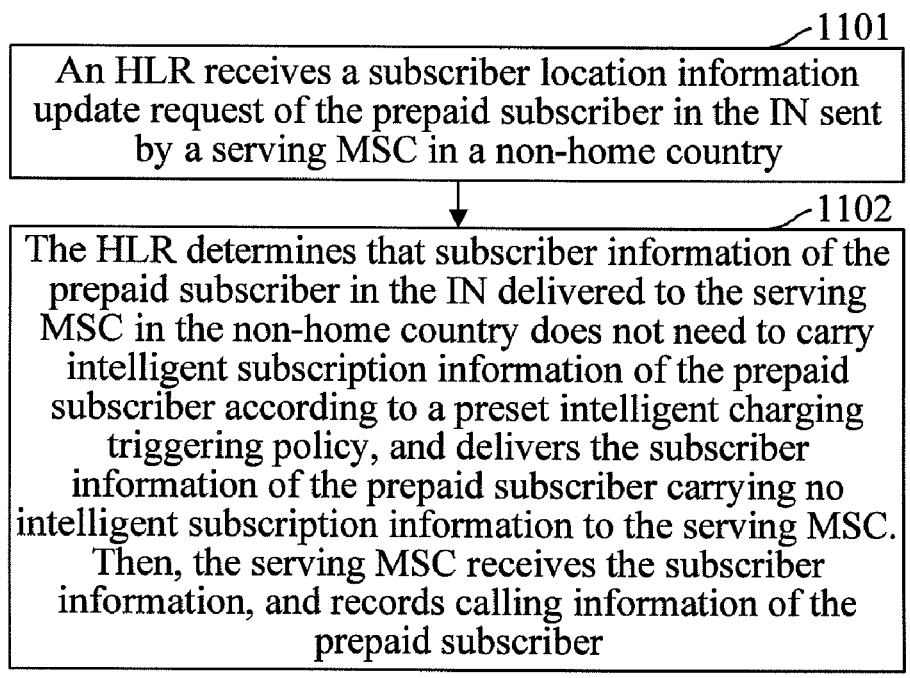
FIG. 11 is a flow chart of an intelligent charging triggering method of a prepaid subscriber according to an embodiment of the present disclosure.

As for the IN-based charging solution for a prepaid subscriber, in order to realize an international roaming service of the prepaid subscriber, the HLR and charging solutions provided according to the embodiments of the present disclosure can be used to realize the international roaming service of the prepaid subscriber in the IN. FIG. 11 is a flow chart of an intelligent charging triggering method of a prepaid subscriber according to an embodiment of the present disclosure. Referring to FIG. 11, the process includes the following steps.

In step 1101, an HLR receives a subscriber location data update request of the prepaid subscriber in the IN sent by a serving MSC in a non-home country.

In step 1102, the HLR determines that subscriber data of the prepaid subscriber in the IN delivered to the serving MSC in the non-home country does not need to carry intelligent subscription data of the prepaid subscriber according to a preset intelligent charging triggering policy, and delivers the subscriber data of the prepaid subscriber carrying no intelligent subscription data to the serving MSC. The serving MSC receives the subscriber data, and records calling data of the prepaid subscriber.

In the flow chart of the method shown in FIG. 11, in order to realize the international roaming service of the prepaid subscriber in the IN, when the prepaid subscriber roams to the non-home country, that is, an international roaming region, the HLR delivers the subscriber data carrying no intelligent subscription data of the prepaid subscriber to the serving MSC in the non-home country. In this way, the signaling interaction on the IN side respectively provided by the operators in the two countries is avoided, and the charging of the prepaid subscriber in the international roaming region is processed by the serving MSC in the non-home country in a manner of taking the prepaid subscriber as a postpaid service subscriber, thereby realizing the international roaming service of the prepaid subscriber.

Figure 12:
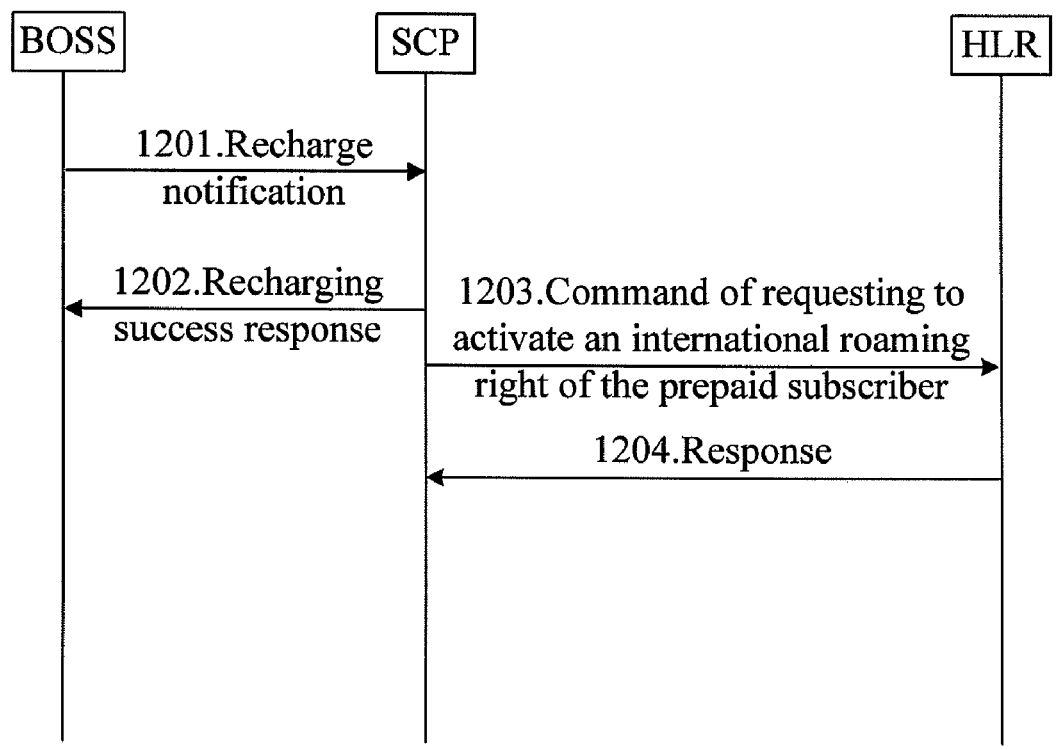
FIG. 12 is a flow chart of a process for subscribing to an international roaming service by a prepaid subscriber according to an embodiment of the present disclosure.

FIG. 12 is a flow chart of subscribing to an international roaming service by a prepaid subscriber according to an embodiment of the present disclosure. Referring to FIG. 12, the process includes the following steps.

In steps 1201-1202, the prepaid subscriber pays for the international roaming caution money in a business hall of the home country, and the amount of the caution money is required to be no less than a preset account threshold corresponding to the international roaming right. Then, a home country BOSS sends a recharge notification to a home country SCP of the prepaid subscriber, and recharges the caution money paid by the prepaid subscriber to the account of the prepaid subscriber; and the home country SCP receives the notification from the home country BOSS, and returns a recharging success response to the BOSS.

In steps 1203-1204, the home country BOSS sends a command of requesting to activate an international roaming right of the prepaid subscriber to an HLR in a home location of the prepaid subscriber. After receiving the command, the HLR sets the locally stored roaming right of the prepaid subscriber to the international roaming right, and returns a response indicating that the international roaming right is successfully activated to the BOSS system.

When the HLR sets the roaming right of the prepaid subscriber to the international roaming right, the HLR may modify the original roaming right of the prepaid subscriber from domestic roaming to the international roaming.

Now, the international roaming service of the prepaid subscriber is successfully activated.

Figure 13:
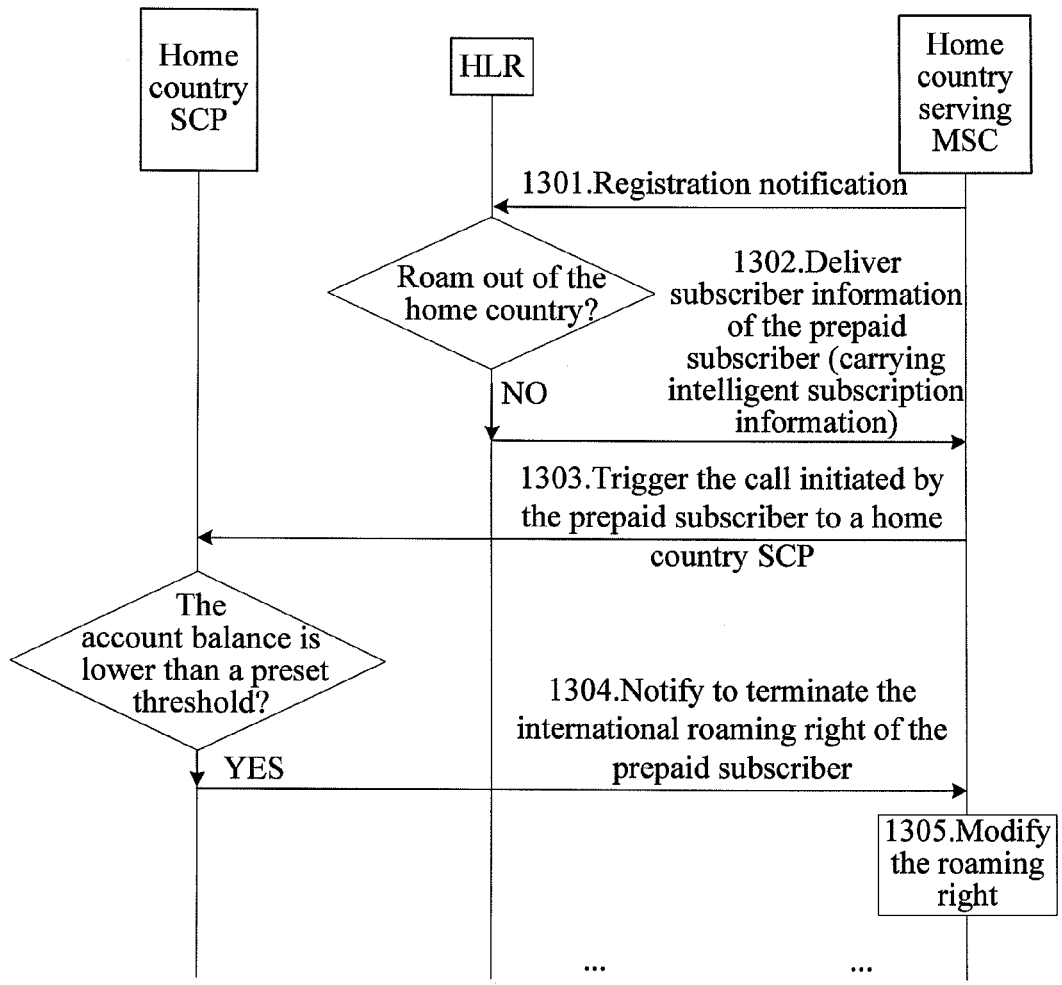
FIG. 13 is a flow chart of a process for carrying out a domestic roaming service by a prepaid subscriber according to an embodiment of the present disclosure.

FIG. 13 is a flow chart of subscribing to a domestic roaming service by a prepaid subscriber according to an embodiment of the present disclosure. Referring to FIG. 13, the process includes the following steps.

In step 1301, the prepaid subscriber roams to a certain roaming region in a home country, and a serving MSC in the home country sends a registration notification to an HLR to request for updating the subscriber location.

In step 1302, the HLR receives the registration notification, and determines that the prepaid subscriber roams in the home country according to an MSCID of the MSC, and returns subscriber data of the prepaid subscriber carrying intelligent subscription data of the prepaid subscriber to the serving MSC in the home country according to a preset intelligent charging triggering policy.

In this embodiment, the employed intelligent charging triggering policy may be as follows. If the prepaid subscriber in the IN roams in the home country, the intelligent subscription data needs to be delivered to the serving MSC.

In step 1303, after the serving MSC in the home country receives the subscriber data of the prepaid subscriber sent by the HLR, when the prepaid subscriber performs a calling service, the serving MSC in the home country triggers the call to an SCP corresponding to the intelligent subscription data.

In step 1304, the SCP monitors the current call of the prepaid subscriber, and after the prepaid subscriber hangs up the phone, the SCP records the current calling data of the prepaid subscriber, and deducts the corresponding call fees from the account of the prepaid subscriber. Furthermore, the SCP compares to determine whether the current account balance of the prepaid subscriber is lower than a preset account threshold corresponding to the international roaming right, and if the prepaid subscriber is lower than a preset account threshold corresponding to the international roaming right, the SCP notifies the HLR to terminate the international roaming right of the prepaid subscriber; otherwise, the process ends.

In step 1305, the HLR receives a notification about requesting to terminate the international roaming right of the prepaid subscriber sent from the SCP, and modifies the locally stored roaming right of the prepaid subscriber to domestic roaming.

Now, the domestic roaming service process of the prepaid subscriber in the IN is completed.

Figure 14:
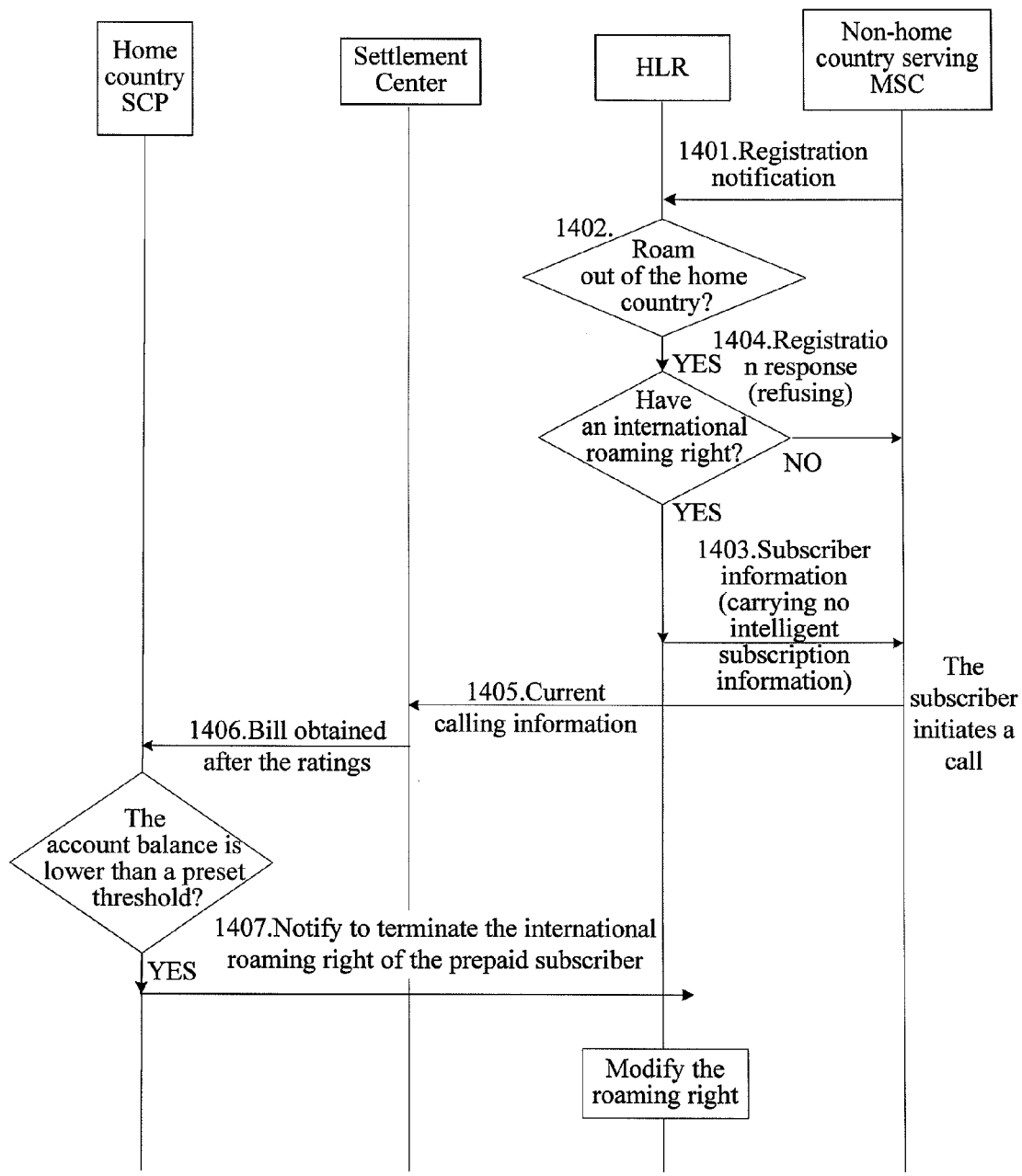
FIG. 14 is a flow chart of a process for carrying out an international roaming service by a prepaid subscriber according to an embodiment of the present disclosure.

FIG. 14 is a flow chart of subscribing to an international roaming service by a prepaid subscriber according to an embodiment of the present disclosure. Referring to FIG. 14, the process includes the following steps.

In step 1401, the prepaid subscriber roams to a non-home country, and a serving MSC in the non-home country detects that the prepaid subscriber accesses a serving area of the serving MSC, and sends a registration notification to an HLR in a home location of the prepaid subscriber.

In step 1402, the HLR receives the registration notification sent by the serving MSC in the non-home country, and determines that the prepaid subscriber roams to the non-home country according to an MSCID of the MSC. If the HLR determines that the prepaid subscriber has an international roaming right according to a locally stored roaming right of the prepaid subscriber, the process proceeds to step 1403; if the roaming right of the prepaid subscriber locally stored in the HLR is a domestic roaming right, the process proceeds to step 1404, and the HLR returns a registration response message of refusing the registration of the prepaid subscriber to the serving MSC in the non-home country.

In step 1403, the HLR carries no intelligent subscription data of the prepaid subscriber in the subscriber data delivered to the serving MSC in the non-home country according to a preset intelligent charging triggering policy when the prepaid subscriber roams to the non-home country.

In this embodiment, the employed intelligent charging triggering policy may be as follows. If the prepaid subscriber in the IN roams to the non-home country, the intelligent subscription data does not need to be sent to the serving MSC.

In steps 1404-1405, after the serving MSC in the non-home country receives the subscriber data returned by the HLR, when the prepaid subscriber performs a calling service, the serving MSC in the non-home country does not trigger an SCP service control process. Instead, after the prepaid subscriber hangs up the phone, the serving MSC in the non-home country records the current calling data of the prepaid subscriber locally, and transfers the current calling data to a settlement center of the BOSS system between the two countries. The settlement center performs a rating process on the current call, and transfers a bill obtained after the rating process to a home country SCP, and the SCP deducts the corresponding call fees from the account of the prepaid subscriber.

In step 1406, the SCP compares the account balance of the prepaid subscriber with an account threshold corresponding to the international roaming right, in which if the account balance of the prepaid subscriber is smaller than the account threshold corresponding to the international roaming right, the SCP sends a notification about requesting to terminate the international roaming right of the prepaid subscriber to the HLR; and after receiving the notification, the HLR modifies the locally stored roaming right of the prepaid subscriber to a domestic roaming right.

Till now, when the prepaid subscriber performs the international roaming service in the case of having the international roaming right, the HLR delivers the subscriber data carrying no intelligent subscription data of the prepaid subscriber to the serving MSC in the non-home country, so as to terminate the triggering of the SCP service control process, thereby enabling the prepaid subscriber to perform a calling service in the non-home country.

Figure 15:
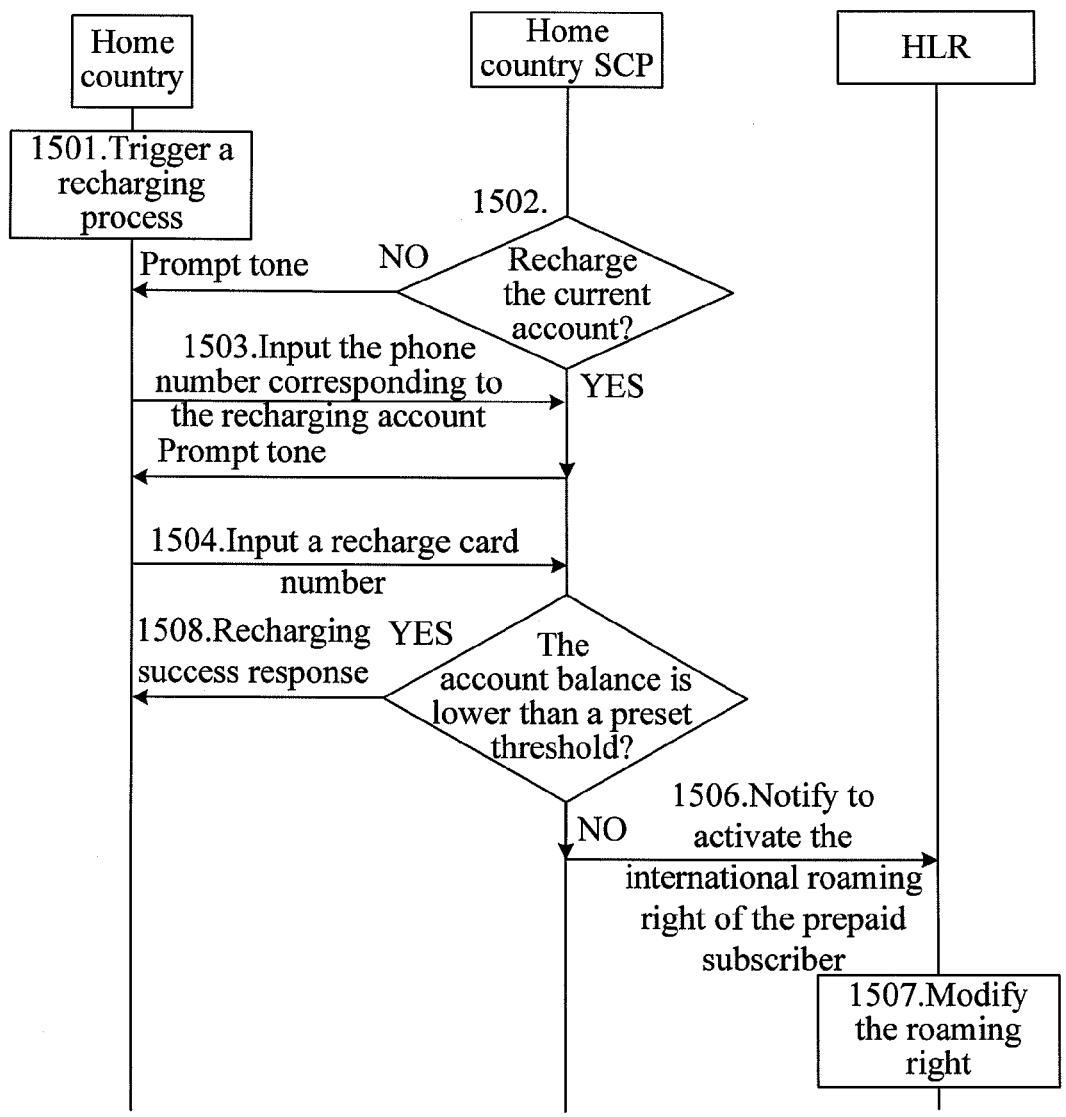
FIG. 15 is a flow chart of a process for recharging of a prepaid subscriber in an IN according to an embodiment of the present disclosure.

FIG. 15 is a flow chart of a process for recharging of a prepaid subscriber in an IN according to an embodiment of the present disclosure. Referring to FIG. 15, the process includes the following steps.

In step 1501, a recharging person may be a prepaid subscriber or someone else, and the recharging person recharges the account of the prepaid subscriber in the home country. Particularly, the recharging person may dial an access number for recharging provided by an operator, and the call is triggered to an SCP by a serving MSC in the home country, so as to trigger a recharging process. The recharging process involves the recharging person, the serving MSC in the home country, the SCP, and an HLR.

In step 1502, the SCP provides a prompt about whether to recharge the current account, and if yes, the process directly proceeds to step 1504; otherwise, the SCP provides a prompt about inputting a phone number corresponding to a recharging account, and then, the serving MSC in the home country returns the prompt to the recharging person, and the process proceeds to step 1503.

In step 1503, the recharging person inputs the phone number corresponding to the recharging account, and then, the serving MSC in the home country transfers the phone number to the SCP, and the process proceeds to step 1504.

In steps 1504-1505, the SCP provides a prompt about inputting a recharge card number to the recharging person through the serving MSC in the home country; and then the recharging person transfers the recharge card number to the SCP through the serving MSC in the home country.

In step 1506, the SCP recharges the account of the prepaid subscriber, and compares to determine whether the account balance is no less than a preset account threshold corresponding to an international roaming right, and if yes, the process proceeds to step 1507; otherwise, the process proceeds to step 1509.

In steps 1507-1508, the SCP notifies the HLR to activate the international roaming right of the prepaid subscriber; and then after receiving the notification from the SCP, the HLR sets a locally stored roaming right of the prepaid subscriber to an international roaming right, and then returns a recharging success response message to the SCP.

In step 1509, the SCP returns the recharging success response message to the serving MSC in the home country, and the process ends.

Figure 16:
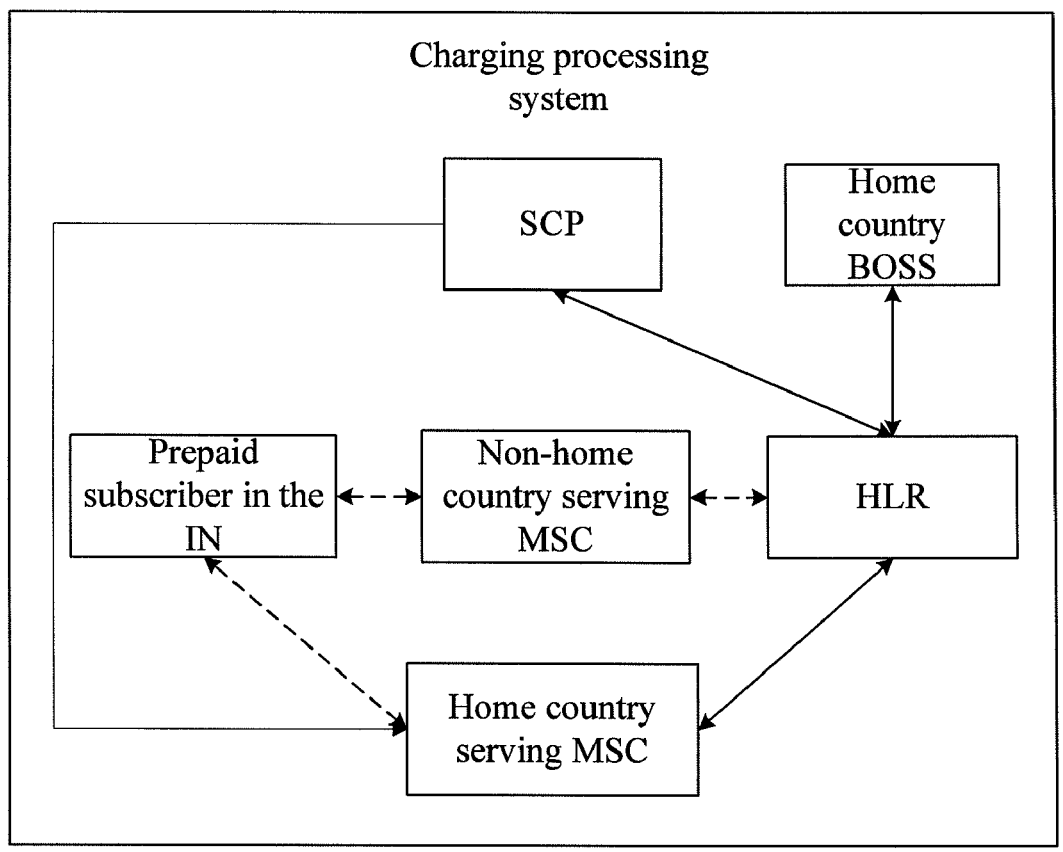
FIG. 16 is another schematic structural view of a charging processing system according to an embodiment of the present disclosure.

An embodiment of the present disclosure provides a charging processing system. FIG. 16 is schematic structural view of the charging processing system. Referring to FIG. 16, the charging processing system may include the HLR, a serving MSC in a non-home country, and a prepaid subscriber in an IN, and may further include the home country BOSS, home country MSC, and home country SCP.

In the above intelligent charging triggering method and associated technical solutions provided in the embodiments of the present disclosure for realizing the international roaming service of the prepaid subscriber in the IN, considering the subscriber property of the prepaid subscriber, though the prepaid subscriber is an intelligent subscription subscriber, the HLR delivers the subscriber data carrying no intelligent subscription data of the prepaid subscriber to the serving MSC in the non-home country when the prepaid subscriber roams to the non-home country, so as to realize the international roaming service of the prepaid subscriber. In this way, the serving MSC in the non-home country does not trigger the SCP service control process of the prepaid subscriber, but performs the charging process on the calling service of the prepaid subscriber locally. That is, after the prepaid subscriber roams to the non-home country, the prepaid subscriber is taken as a postpaid service subscriber, so as to enable the prepaid subscriber to perform the calling service in the non-home country. Furthermore, the charging solution for ensuring the prepaid subscriber to perform the international roaming service provided in the embodiments of the present disclosure does not need modification on the interconnection between the INs of the two countries, which thus has a lower implementation cost, and the operators are enabled to quickly realize the international roaming service of the prepaid subscriber in the IN. Furthermore, the SCP is configured to monitor the account balance of the prepaid subscriber, and when the account balance is smaller than the preset threshold, the SCP notifies the HLR to terminate the international roaming right of the prepaid subscriber, thereby reducing the loss of the operators caused by over consumption of the prepaid subscriber when performing the international roaming service to the large extent.

To sum up, in the technical solutions provided in the embodiments of the present disclosure, the HLR is improved to determine whether the intelligent subscription data of the prepaid subscriber needs to be delivered to the serving MSC according to the preset intelligent charging triggering policy, so as to control the triggering of the intelligent charging process through the serving MSC. When the HLR provided in the embodiment of the present disclosure is applied to the intelligent charging triggering method provided in the embodiment of the present disclosure, as for the BOSS subscriber in the BOSS, in order to realize the real-time charging of the calling service of the BOSS subscriber when the BOSS subscriber roams in the non-home charging region of the home country, the HLR is set to deliver the intelligent subscription data of the BOSS subscriber to the serving MSC when the BOSS subscriber roams in the non-home charging region of the home country, and the serving MSC triggers the calling service of the BOSS subscriber to the corresponding SCP, and then the SCP performs a real-time monitoring on the calling service of the BOSS subscriber. As for the prepaid subscriber in the IN, in order to realize the international roaming service of the prepaid subscriber, the HLR is set not to deliver the intelligent subscription data of the prepaid subscriber to the serving MSC of the non-home country when the prepaid subscriber roams to the non-home country, and correspondingly, as for the serving MSC of the non-home country, the prepaid subscriber is actually taken as a postpaid service subscriber, and the serving MSC in the non-home country performs the charging processing on the calling service of the prepaid subscriber, so as to enable the prepaid subscriber in the IN to realize the international roaming service.

Through the above description in the detailed embodiments, it is clear to those skilled in the art that the present disclosure may be accomplished through hardware, or through software plus necessary universal hardware platform. Based on this, the technical solutions of the present disclosure may be embodied in the form of a software product. The software product may be stored in one or more nonvolatile storage media (for example, CD-ROM, USB flash drive, or removable hard disk) and contain several instructions used for instructing a computer equipment (for example, a personal computer, a server, or a network equipment) to perform the method according to the embodiments of the present disclosure.

The above descriptions are merely preferred embodiments of the present disclosure, but not intended to limit the present disclosure. Any modification, equivalent replacement, and improvement made without departing from the principle of the present disclosure shall fall within the scope of the present disclosure.

What is claimed is:

1. An intelligent charging triggering method, comprising:
  disposing a service control point (SCP) between a billing system of a billing and operation support system (BOSS) system and a switching center at a core network side;
  receiving a subscriber location data update request sent by a serving mobile switching center (MSC);
  determining, by a home location register (HLR), whether subscriber data delivered to the serving MSC needs to carry intelligent subscription data of a subscriber according to a preset intelligent charging triggering policy;
  delivering the subscriber data carrying the intelligent subscription data to the serving MSC when the subscriber data delivered to the serving MSC needs to carry the intelligent subscription data of the subscriber;
  setting a locally stored BOSS subscriber property to an intelligent subscription subscriber; and
  triggering a calling service of a BOSS subscriber in a non-home charging region of a home country to a corresponding SCP, so that the corresponding SCP monitors the calling service of the BOSS subscriber in real time, thereby realizing the real-time charging.

2. The method of claim 1, wherein determining whether subscriber data delivered to the serving MSC needs to carry intelligent subscription data of a subscriber according to a preset intelligent charging triggering policy comprises:
  determining that the subscriber data delivered to the serving MSC needs to carry the intelligent subscription data of the subscriber when the subscriber is the BOSS subscriber, and the BOSS subscriber is located at a non-home charging region of a home country.

3. The method of any claim 2, further comprising:
  setting a locally stored subscriber property to an intelligent subscription subscriber, after determining that the subscriber data delivered to the serving MSC needs to carry the intelligent subscription data of the subscriber.

4. The method of claim 2, further comprising:
  triggering, by the serving MSC, after receiving the subscriber data of the BOSS subscriber, a calling service of the BOSS subscriber to a service control point (SCP) that is disposed between the serving MSC and a BOSS and corresponds to the intelligent subscription data, the SCP records calling data of the BOSS subscriber.

5. The method of claim 4, further comprising:
  obtaining, by a billing system of the BOSS, the calling data of the BOSS subscriber; and
  performing, by the billing system in the BOSS, rating on the calling service of the BOSS subscriber, and updating account data of the BOSS subscriber.

6. The method of claim 5, wherein obtaining the calling data of the BOSS subscriber comprises:
  collecting, by a bill collector in the home charging region, calling bill corresponding to the calling data from the SCP;
  performing, by the bill collector, a pre-processing on the collected calling bill; and
  transferring, by the bill collector, the calling bills to the billing system of the BOSS for rating.

7. The method of claim 4, wherein the calling data may comprise at least one of a call duration, a calling position, and a service type.

8. The method of claim 1, wherein determining whether subscriber data delivered to the serving MSC needs to carry intelligent subscription data of a subscriber according to a preset intelligent charging triggering policy comprises:
  determining that the subscriber data delivered to the serving MSC does not need to carry the intelligent subscription data of the subscriber when the BOSS subscriber, and the BOSS subscriber is located at a home charging region of a home country.

9. The method of claim 8, further comprising:
  setting a locally stored subscriber property to a non-intelligent subscription subscriber, after determining that the subscriber data delivered to the serving MSC does not need to carry the intelligent subscription data of the subscriber.

10. The method of claim 1, wherein determining whether subscriber data delivered to the serving MSC needs to carry intelligent subscription data of a subscriber according to a preset intelligent charging triggering policy comprises:
  determining that the subscriber data delivered to the serving MSC needs to carry the intelligent subscription data of the subscriber when the subscriber is a prepaid subscriber in an intelligent network (IN) and the prepaid subscriber roams in a home country.

11. The method of claim 1, wherein determining whether subscriber data delivered to the serving MSC needs to carry intelligent subscription data of a subscriber according to a preset intelligent charging triggering policy comprises:
  determining that the subscriber data delivered to the serving MSC does not need to carry the intelligent subscription data of the subscriber when the subscriber is a prepaid subscriber in an intelligent network (IN) and the prepaid subscriber roams to a non-home country.

12. The method of claim 11, further comprising:
  recording, by the serving MSC, calling data of the prepaid subscriber after receiving the subscriber data of the prepaid subscriber.

13. The method of claim 12, before delivering the subscriber data of the prepaid subscriber carrying no intelligent subscription data to the serving MSC, the method further comprises:
  receiving, by the HLR, a command of requesting to activate an international roaming right of the prepaid subscriber from a home country BOSS;
  setting, by the HLR, locally stored roaming right of the prepaid subscriber to the international roaming right, according to the command; and
  determining, by the HLR, that the prepaid subscriber has an international roaming right according to the locally stored roaming right of the prepaid subscriber.

14. The method of claim 12, after recording the calling data of the prepaid subscriber, the method further comprises:
  receiving, by the home country BOSS, a bill of the prepaid subscriber of international roaming which is generated by a non-home country BOSS after performing a rating process; transferring the bill to a home country SCP, so that the home country SCP deducts call fees corresponding to the bill from an account of the prepaid subscriber stored on the home country SCP.

15. The method of claim 12, after delivering the prepaid subscriber data carrying the subscriber intelligent subscription data to the serving MSC in the home country, the method further comprises:
triggering, by the serving MSC in the home country after receiving the prepaid subscriber data, a calling service of the prepaid subscriber to a service control point (SCP), so as to the SCP records calling data of the BOSS subscriber.

16. The method of claim 12, wherein after recording the calling data of the prepaid subscriber, the method further comprises:
deducting, by the SCP, call fees corresponding to a bill from a locally stored account of the prepaid subscriber.

17. The method of claim 12, wherein after deducting call fees corresponding to a bill from a locally stored account of the prepaid subscriber, the method further comprises:
comparing, by the SCP, the account balance of the prepaid subscriber with an account threshold corresponding to the international roaming right; and
sending, by the SCP, a notification about requesting to terminate the international roaming right of the prepaid subscriber to the HLR, when the account threshold corresponding to the international roaming right is more than the account balance of the prepaid subscriber.

18. An intelligent charging triggering system, comprising:
a service control point (SCP) and a home location register (HLR), wherein the SCP is disposed between a billing system of a billing and operation support system (BOSS) system and a switching center at a core network side;
the home location register (HLR) comprising: a receiving unit, a determining unit, a property setting unit, and a subscriber data delivering unit; wherein:
the receiving unit is configured to receive a subscriber location data update request sent by a serving MSC;
the determining unit is configured to determine whether subscriber data delivered to the serving MSC needs to carry intelligent subscription data of a subscriber according to a preset intelligent charging triggering policy after the receiving unit receives the request;
the property setting unit is configured to set a locally stored subscriber property to an intelligent subscription subscriber when the determination result is that the subscriber data delivered to the serving MSC needs to carry the intelligent subscription data, and to set the locally stored subscriber property to a non-intelligent subscription subscriber when the determination result is that the subscriber data delivered to the serving MSC does not need to carry the intelligent subscription data; and
the subscriber data delivering unit is configured to deliver the subscriber data carrying the intelligent subscription data to the serving MSC, when the determination result is that the subscriber data delivered to the serving MSC needs to carry the intelligent subscription data, and to trigger a calling service of a BOSS subscriber in a non-home charging region of a home country to a corresponding SCP, so that the corresponding SCP monitors the calling service of the BOSS subscriber in real time, thereby realizing the real-time charging.

* * * * *